(12) United States Patent
Iannazzi (10) Patent No.: US 7,002,614 B2
(45) Date of Patent: Feb. 21, 2006

(54) METHOD FOR CALIBRATION OF A LASER THERMAL HALFTONE PRINTER

(75) Inventor: Craig Iannazzi, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 106 days.

(21) Appl. No.: 10/649,462

(22) Filed: Aug. 26, 2003

(65) Prior Publication Data

US 2005/0046655 A1  Mar. 3, 2005

(51) Int. Cl.
*B41J 2/47* (2006.01)

(52) U.S. Cl. .................. 347/240; 347/251
(58) Field of Classification Search .......... 347/19, 347/116, 131, 188, 195, 240, 251–254; 382/112, 382/164, 167, 169, 199, 266, 274, 300, 276, 382/282; 358/1.9, 448, 461, 465; 399/15; 702/85–86

See application file for complete search history.

(56) References Cited

U.S. PATENT DOCUMENTS

| | | | |
|---|---|---|---|
| 5,268,708 A | 12/1993 | Harshbarger et al. | 346/134 |
| 5,428,371 A | 6/1995 | Fox et al. | 347/262 |
| 5,461,462 A * | 10/1995 | Nakane et al. | 399/15 |
| 5,966,506 A * | 10/1999 | Morton | 358/1.9 |

* cited by examiner

*Primary Examiner*—Hai Pham
(74) *Attorney, Agent, or Firm*—Buskop Law Group (57) ABSTRACT

A method of calibrating a printing system is described herein. The method includes imaging a test pattern. The test pattern includes a set of densities. Each density is based on a plurality of exposures which have been randomized thereby forming an imaged test pattern. The method further includes scanning the densities of the imaged test pattern thereby forming a dataset. In one embodiment, the density of the test pattern is made from a thermal dye donor. In another embodiment, the density of the test pattern comprises multiple colors. Then, the method includes analyzing the dataset to identify outlier data. The method then includes calibrating an adjustable density printing system using the polynomial calibration curve.

18 Claims, 6 Drawing Sheets

METHOD FOR CALIBRATION OF A LASER THERMAL HALFTONE PRINTER

FIELD OF THE INVENTION

The presented invention relates to a method for calibrating a laser thermal proofer and more specifically imaging a randomized calibration pattern, measuring the resulting density, and calculation of a calibration curve.

BACKGROUND OF THE INVENTION

Color proofing is a process used by the printing industry to simulate proofs generated on a press run. By using color proofing the printing industry saves time and money simulating how the press will look before the costly press run is performed. The advantage of a color proof is that it is a representation of an ideal press run. The color proof should reflect exactly what the printing industry would like to see coming off a press. The press is continually adjusted to match the color of the proof. The color proof therefore needs to be precise color, reproducible from proofer to proofer, and pre-press shop to pre-press shop. Proofs that exhibit color variation are deemed unacceptable.

One commercially available image processing apparatus, which is depicted in commonly assigned U.S. Pat. No. 5,428,371, is an image processing apparatus having halftone color proofing capabilities. This image processing apparatus is arranged to form an intended image on a sheet of thermal print media by transferring dye from a sheet of dye donor material to the thermal print media by applying thermal energy to the dye donor material, to transfer dye to the thermal print media, thereby forming an intended image. This image processing apparatus is comprised generally of a material supply assembly or carousel, lathe bed scanning subsystem (which includes a lathe bed scanning frame, translation drive, translation stage member, printhead, and vacuum imaging drum), and thermal print media and dye donor material exit transports.

The operation of the image processing apparatus comprises feeding a sheet of thermal media from the media roll to the vacuum drum, partially wrapped around the drum, cut to length, then wrapped fully around the drum. A length of dye donor from a roll form is similarly transported to the drum, partially wrapped around the drum, cut to a desired length, then fully wrapped around the vacuum drum. The dye donor material is wrapped around the vacuum imaging drum, such that it is superposed in registration with the thermal print media. The translation drive, part of the scanning subsystem, traverses the printhead and translation stage member axially along the vacuum imaging drum in coordinated motion with the rotating vacuum imaging drum to produce the intended image on the thermal print media.

The printhead includes a plurality of laser diodes which are coupled to the printhead by fiber optic cables which can be individually modulated to supply energy to selected areas of the donor in accordance with an information signal. The printhead includes a plurality of optical fibers coupled to the laser diodes at one end and at the other end to a fiber optic array within the printhead. The printhead moves relative to the longitudinal axis of the vacuum imaging drum and dye is transferred to the thermal print media as the radiation, transferred from the laser diodes by the optical fibers to the printhead to the dye donor material, is converted to thermal energy in the dye donor material.

Color variation is typically a result of variation of the individual color density used to define the desired color. There are many factors that influence the variation of a color in a proof. Factors include but are not limited to environment variability, density calibration technique, optical noise, thermal media coating quality, densitometer measurement noise, lamination noise, and digital proofer focus errors.

Due to factors that cause density variation, calibration of density is required to achieve high levels of consistency between a requested or desired density and the average density on an imaged proof. Calibration to the average proof density is desired due to the fluctuation of density within a single proof. To be most color accurate across the entire proof the average density should closely match the requested density.

Some early digital proofers, such as U.S. Pat. No. 5,268,708 utilized a linear calibration model over a specified density range. Specifications for the output density range were developed from printing standards. The SWOP standard was the model used for the calibration range for U.S. Pat. No. 5,268,708.

Presses are capable of producing more than cyan, magenta, yellow, and black output colors. Often special colors are added to expand the color of a print. Colors from a press are limited to the various ink colors that can be mixed or created—a virtually endless assortment. Presses therefore had a much larger color gamut than proofers, which are limited by the color gamut produced by thermal dye.

With the introduction of U.S. Pat. No. 5,428,371, color gamuts were expanded using a concept named "Recipe Color." The amount of usable density range was increased for each thermal dye donor. Multiple passes of the same bitmap used for a single color plane were performed using different thermal dye donor material. This allowed for custom color creation, and with the introduction of a few special thermal dye donor material, the color range of a proof is extended to closely match a presses output using many different inks.

Initially the calibration of density for the extended density range of a thermal dye donor was performed by extrapolating the linear model derived using a calibration curve fit to the SWOP density range. The thermal donor material however did not exhibit a linear response across the full output density range. There existed variation in linearity between dye donor material and a manufacturing event of a single dye donor material. Furthermore thermal dye donor linear response varied machine to machine. Thermal dye donor also responded unpredictably due to machine shifts, or machine servicing.

The imaging and lamination process for U.S. Pat. No. 5,428,371 often can lead to dust spots on a proof. Additionally scanning the calibration target using a scanning spectrophotometer can lead to erroneous data. The initial calibration model for U.S. Pat. No. 5,428,371 did not filter out possible erroneous data which therefore led to inaccurate calibrations.

SUMMARY OF THE INVENTION

Briefly summarized, according to one aspect of the present invention, a method for calibration for an imaging apparatus comprises printing a set of patches for each thermal dye donor material wherein exposure is varied in a random pattern from one patch to another. A density for each of the patches is measured in the series of patches. A calibration curve is calculated for the imaging apparatus based on a polynomial curve of density and exposure for each of the patches.

According to one embodiment a series of test patches covering the range of desired exposures are imaged in order using randomized exposure values. The randomized nature of the data points, the range of exposures the points cover, and the number of points are used in order to gain high accuracy with the presence of many noise sources. The calibration proof is designed to be scanned in allowing for polynomial interpolation between patches for precise location of the requested density.

An advantage of the present invention is increased accuracy in locating the average density request over an increased density range.

An advantage of the present invention is increased reproducibility calibration to calibration, machine to machine, and for a single machine.

An advantage of the present invention is increased color accuracy from proofer to proofer, calibration to calibration.

An advantage of the present invention is increased calibration stability after equipment maintenance.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
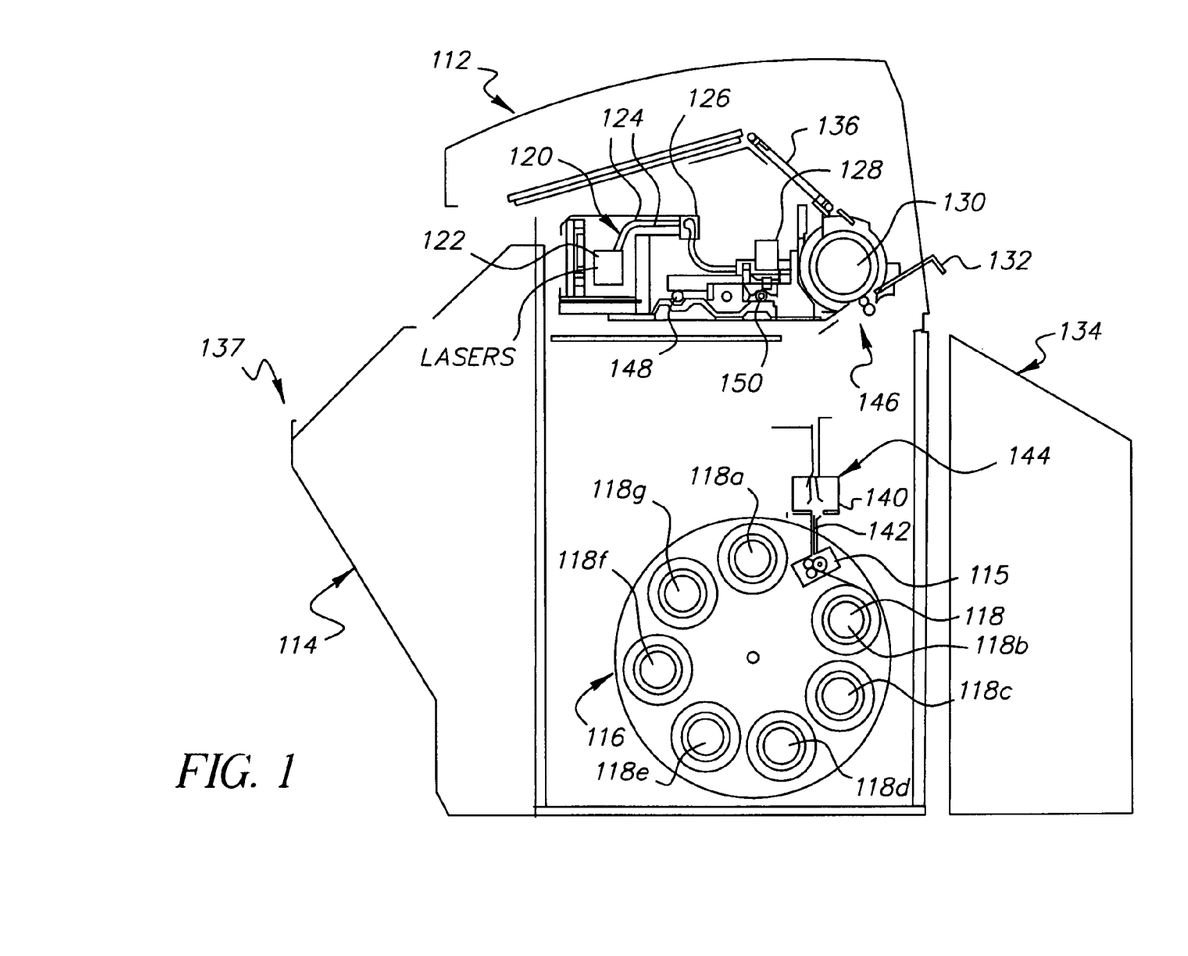
FIG. 1 is a side view and vertical cross-section of an image processing apparatus usable with embodiments of the present invention.

Referring to FIG. 1, there is illustrated an image processing apparatus according to the present invention having an image processor housing 112 which provides a protective cover. A movable, hinged image processor door 114 is attached to the front portion of image processor housing 112 permitting access to a media carousel 116. A roll of donor roll material 118a is connected to a media carousel 116 in a lower portion of image processor housing. Up to seven rolls of roll media can be used 118a, 118b, 118c, 118d, 118e, 118f and 118g. One roll of media 118g is thermal print media used to receive the donor material. This thermal print media 118g is passed to vacuum imaging drum 130 and is ultimately cut into donor sheet material (not shown). In this regard, a media drive mechanism 115 is attached to the thermal print media 118g, and includes three media drive rollers (not shown), through which the thermal print media of interest is metered upwardly into a media knife assembly 144. After thermal print media reaches drum load roller 146, media drive rollers (not shown) cease driving the donor roll material and at least one media knife blade 140, 142 positioned at the bottom portion of media knife assembly can be engaged to cut the thermal print media roll into thermal print media sheets. Drum load roller 146 presses the cut thermal print media against the vacuum imaging drum 130 while the vacuum imaging drum 130 slowly rotates the cut media (not shown) around vacuum imaging drum 130.

Each remaining roll of donor material is a different color, typically black, yellow, magenta and cyan. Special colors include but are not limited to orange, green, blue, metallic, and white. These donor roll materials are passed to the vacuum imaging drum 130 and are ultimately cut into donor sheet materials (not shown) for forming the medium from which colorant imbedded therein are passed to thermal print media resting thereon, which process is described in detail below.

A media drive mechanism 115 is attached to each roll media of donor roll material, and includes three media drive rollers (not shown) through which the donor roll material 118a, 118b, 118c, 118d, and 118e of interest is metered upwardly into a media knife assembly 144. After donor roll material reaches drum load roller 146, media drive rollers (not shown) cease driving the donor roll material and the media knife blade is positioned at the bottom portion of media knife assembly to cut the donor roll material into donor sheet materials. Drum load roller 146 presses the cut media against the vacuum imaging drum 130 while the vacuum imaging drum 130 slowly rotates the cut media (not shown) around vacuum imaging drum 130. The donor sheet material now rests atop the thermal print media (not shown) with a narrow space between the two created by microbeads embedded in the surface of the thermal print media.

A laser assembly 120 includes a quantity of laser diodes 122 in its interior. Laser diodes 122 are connected via fiber optic cables 124 to a distribution block 126 and ultimately to printhead 128. Printhead 128 directs thermal energy received from laser diodes 122 causing the donor sheet material to pass the desired colorant across the gap and onto the thermal print media (not shown).

In operation, vacuum imaging drum 130 rotates at a constant velocity. Printhead 128 begins at one end of the thermal print media and traverses the length of the thermal print media, transferring dye for a particular donor sheet material resting on the thermal print media. After printhead 128 has completed the transfer process, for the donor sheet material resting on the thermal print media the donor sheet material is then removed from the vacuum imaging drum 130 and transferred out of image processor housing 112 via a skive or donor ejection chute 132. The donor sheet material eventually comes to rest in a donor waste bin 134 for removal by the user. The process is then repeated for the other desired rolls of donor roll media.

After the color from all desired sheets of the donor materials have been transferred and the donor sheet materials have been removed from vacuum imaging drum 130, the thermal print media is removed from vacuum imaging drum 130 and transported via a transport mechanism 136 to a exit tray 137. Thermal print media is then laminated to a paper stock using a 800XL laminator. FIG. 1 also show translation bearing rods 146, 150 which are explained with reference to FIG. 2.

Figure 2:
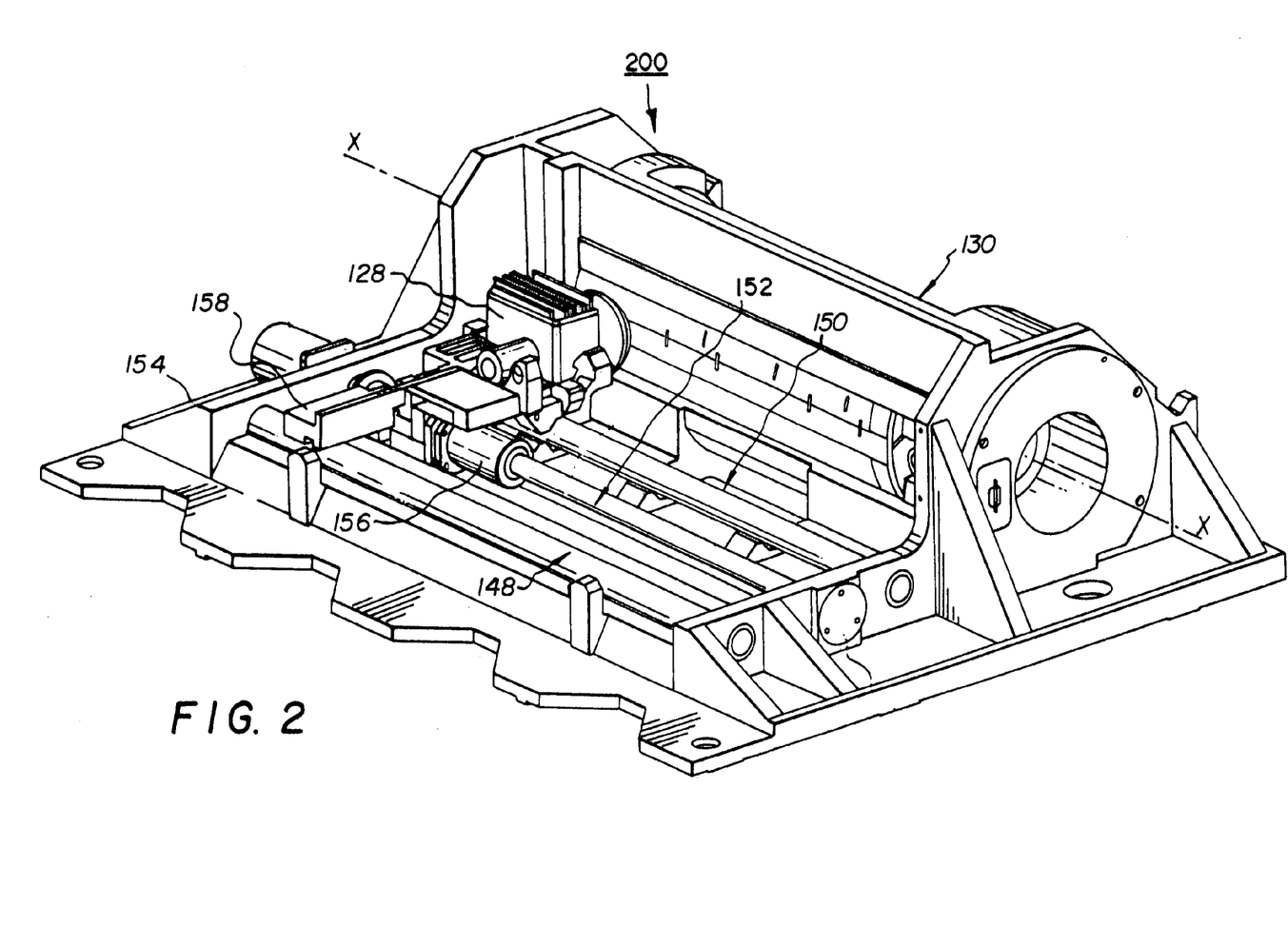
FIG. 2 is a perspective view of the lathe bed scanning subsystem usable with embodiments of the present invention viewed from the rear of the image processing apparatus.

FIG. 2 shows a perspective view of lathe bed scanning subsystem of image processing apparatus, including vacuum imaging drum 130, printhead 128, and lead screw 152 assembled in lathe bed scanning frame 154. Printhead 128 is attached to a lead screw 150 via a lead screw drive nut 156 and a drive coupling (not shown) for moving the printhead along the longitudinal axis of vacuum imaging drum 130 for transferring the dye to create the intended image onto the thermal print media 118g.

Vacuum imaging drum 130 is mounted for rotation about an axis X in lathe bed scanning frame 154. Printhead 128 is movable with respect to vacuum imaging drum 130, and is arranged to direct a beam of light to the donor sheet material. The beam of light from printhead 128 for each laser diode (not shown in FIG. 2) is modulated individually by modulated electronic signals from image processing apparatus, which are representative of the shape and color of the original image, so that the color on the donor sheet material is heated to cause volatilization only in those areas in which its presence is required on the thermal print media to reconstruct the shape and color of the original image.

Translation

Viewing FIGS. 1 and 2, printhead 128 is mounted on a movable translation stage member 158 which, in turn, is supported for low friction slidable movement on translation bearing rods 148 and 150. Translation bearing rods 148 and 150 are sufficiently rigid so as not to sag or distort as is possible between their mounting points and are arranged to be as parallel as possible with axis X of vacuum imaging drum 130 with the axis of printhead 128 perpendicular to the axis X of vacuum imaging drum 130. Front translation bearing rod 150 locates translation stage member 158 in the vertical and the horizontal directions with respect to axis X of vacuum imaging drum 130. Rear translation bearing rod 148 locates translation stage member 158 only with respect to rotation of translation stage member 158 about front translation bearing rod 150 so that there is no over-constraint condition of translation stage member 158 which might cause it to bind, chatter, or otherwise impart undesirable vibration or jitters to printhead 128 during the generation of an intended image.

Writing

Printhead 128 travels in a path along vacuum imaging drum 130, while being moved at a speed synchronous with the vacuum imaging drum 130 rotation and proportional to the width of a writing swath (not shown). The pattern that printhead 128 transfers to the thermal print media 118g along vacuum imaging drum 130 is a helix.

Figure 3:
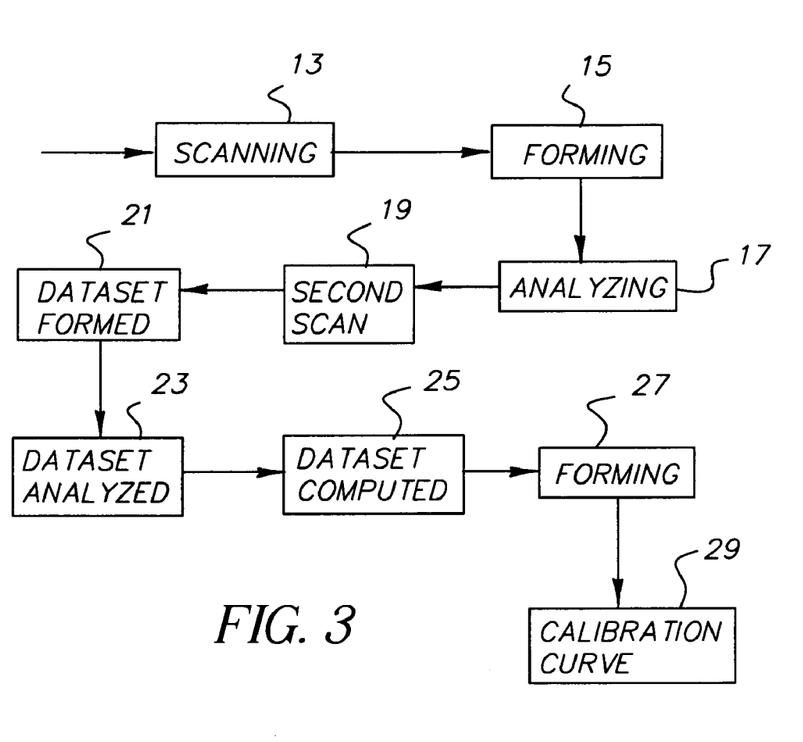
FIG. 3 is a schematic diagram of the method of the embodiments described herein.

FIG. 3 shows the steps of the embodiments described herein. The embodiments described herein generally include a method of calibrating a printing system. The method includes imaging 11 a test pattern 10. The test pattern 10 includes a set of densities. Each density is based on a plurality of exposures which have been randomized thereby forming an imaged test pattern.

The method further includes scanning 13 the densities of the imaged test pattern 12 thereby forming 15 a dataset 14. In one embodiment, the density of the test pattern is made from a thermal dye donor. In another embodiment, the density of the test pattern comprises multiple colors.

Then, the method includes analyzing 17 the dataset 16 to identify outlier data 18. If outlier data is identified, then the test pattern 10 undergoes a second scan 19, a second dataset is formed 21 and the second dataset is analyzed 23 for outlier data 26. If no outlier data is identified, a first density point 28 and a second density point 30 of the dataset are computed 25 to form an array 36a, 36b, 36c of exposures versus a density between the first and second density points, thereby forming 27 a polynomial calibration curve 38 from the array of exposures and the density array. For example, the first density point can be a toe point. The second density point can be a shoulder point. Alternatively, the second density point can be a desired density point for setting a maximum for a polynomial calibration curve, as described below.

The method then includes calibrating 29 an adjustable density printing system 40 using the polynomial calibration curve.

In one embodiment, the method further includes calculating for a threshold of the density data to obtain the toe density point. In another embodiment, the method includes laminating the test pattern onto a paper stock.

In one embodiment, the imaged test pattern is formed by a printing system comprising a printer, a laminator, a spectrometer or combinations thereof. In yet another embodiment, the printing system is a laser thermal, silver halide, or an inkjet printer. In yet another embodiment, the printing system is a digital printer. In yet another embodiment, the printing system comprises a laser printer.

In another embodiment, the method further includes removing data outside of three standard deviations from the polynomial calibration curve.

The method can further include after forming a polynomial calibration curve 38 from the array of exposures and the density array, computing a first slope 44 for density greater than the second density point.

Alternatively, the method can include after forming a polynomial calibration curve 38 from the array of exposures and the density array, computing a second slope 46 for density less than the first density point.

In one embodiment, the first and second slopes are extensions of the polynomial calibration curve therein adapting the curve to be usable for extreme density ranges.

In another embodiment, the method includes subtracting paper density from the dataset enabling the calibration curve to be insensitive to the type of paper stock used in the printing system.

Figure 4:
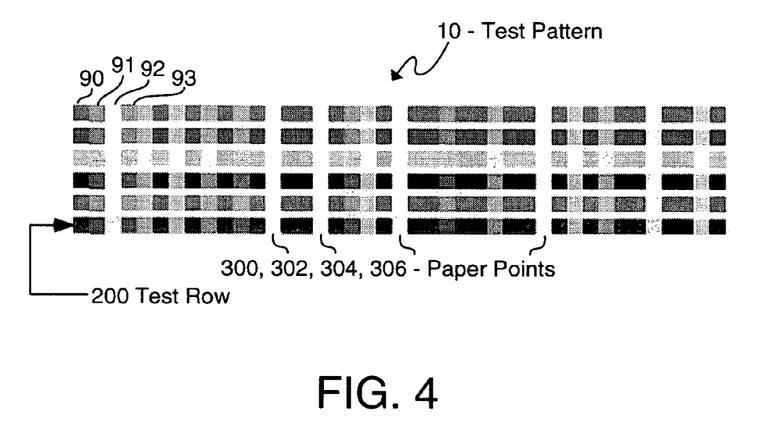
FIG. 4 shows a representation of the test pattern with a set of randomized exposures.

In yet another embodiment, the test pattern 10 includes an independent row 200 for each set of densities 90, 91, 92, 93 and at least four points within a row 300, 302, 304, 306 that include only paper density.

Calibration Target or Test Pattern

FIG. 4 shows a test pattern 10 which is used to measure the output density for a requested exposure. The test pattern preferably includes forty-one sets of density 90, 91, 92, 93, forty per color. Up to six colors can be included on the test pattern. A separate row 200 with a unique exposure array per row is used for each thermal dye donor when imaging multiple thermal dye donors on a single calibration target. The patches 40 are arranged in the slow scan direction of the proofer in order to capture the majority of the density variability. Orientating the sets of density data in the direction of the largest noise source is generally necessary to provide an accurate average density response. The number of sets of density has been maximized in order to generate accuracy in the presence of density noise. The order of the exposures has been randomized to provide stability of the calibration model in the presence of density noise. The order of the sets of density also allows for a minimum patch to patch contrast of 0.5 density, which is required to use a scanning spectrophotometer model number DTP-41 manufactured by X-Rite. Forty-one exposures have been predetermined for each donor based on desired calibration accuracy, thermal media variability, and machine variability. Exposure step rates are not consistent; there exists a smaller exposure step rate at low exposures levels to provide the most accurate low density response. At higher exposure levels, the exposure step rate increases. Very high exposures are added to accommodate machine drift. Four paper points

300, 302, 304, 306 are placed in the calibration target for accurate measurement of the paper stock. The model subtracts the paper density off the measured density to allow for consistent density output across different paper stocks.

Density Processing

The test pattern 10 is scanned in using a X_Rite DTP41 spectrophotometer and a custom graphical user interface to allow for density viewing, saving and processing. The results of the density processing can be seen in FIGS. 5 and 6.

Figure 5:
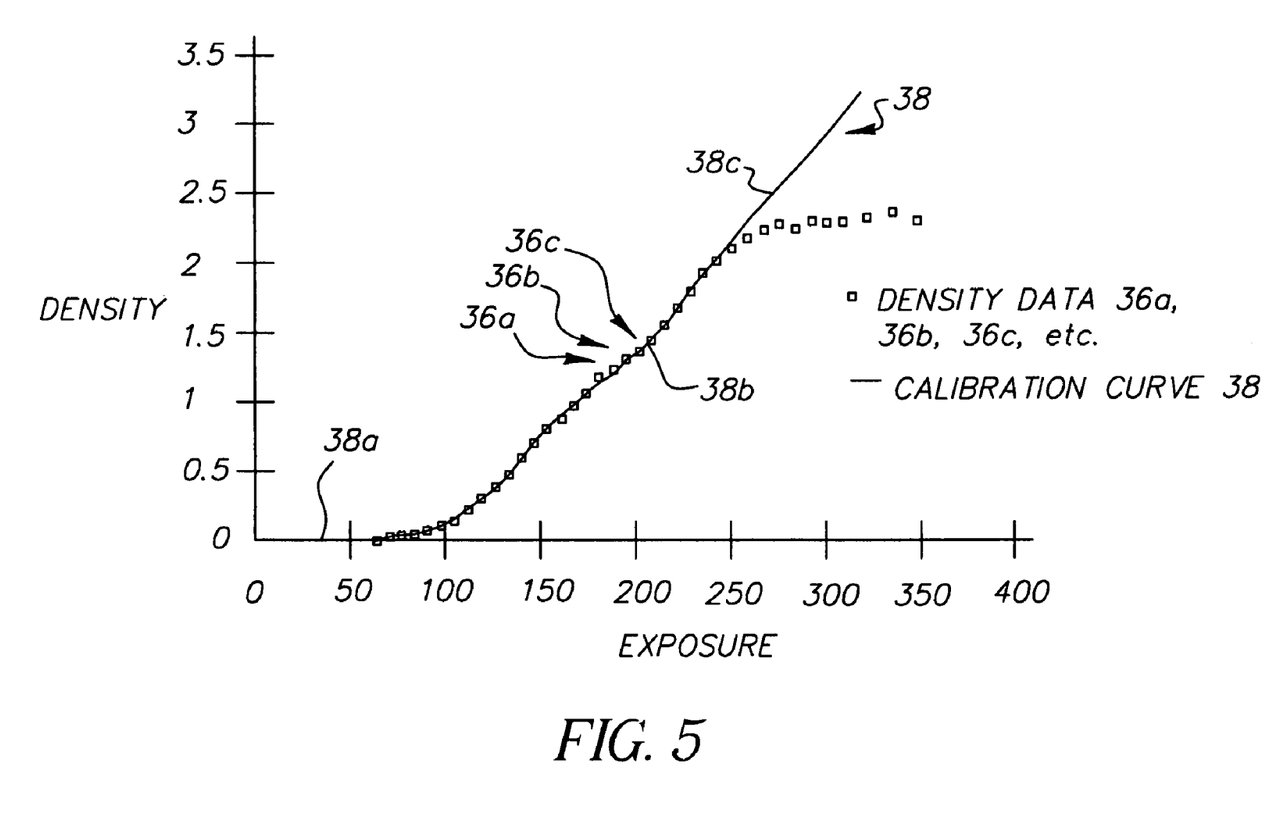
FIG. 5 shows an example of the calibration curve.

The first step in generating a calibration curve 38 is to remove the paper density from the measured density array made of density values 36a, 36b, 36c. The four paper points 300, 302, 304, 306 are averaged to provide greater statistical accuracy. Removing the paper density allows for consistent calibration using various types of paper.

The density 36 is checked for the scanning direction of the calibration target or test image. It is possible to scan the target in either direction, therefore, to avoid user introduced errors, the densities are checked for correct order.

The entered densities 36a, 36b, 36c are then error checked using the correlation coefficient of an $8^{th}$ degree polynomial fit to the measured density at different exposure request data. This check is to ensure that the entered density data will provide a reasonable model. Spectrophotometer scanning errors and other erroneous data can be caught using this technique and the test image will be required to be re-measure. The entered densities are then checked for outlier data points using the following technique.

Figure 6:
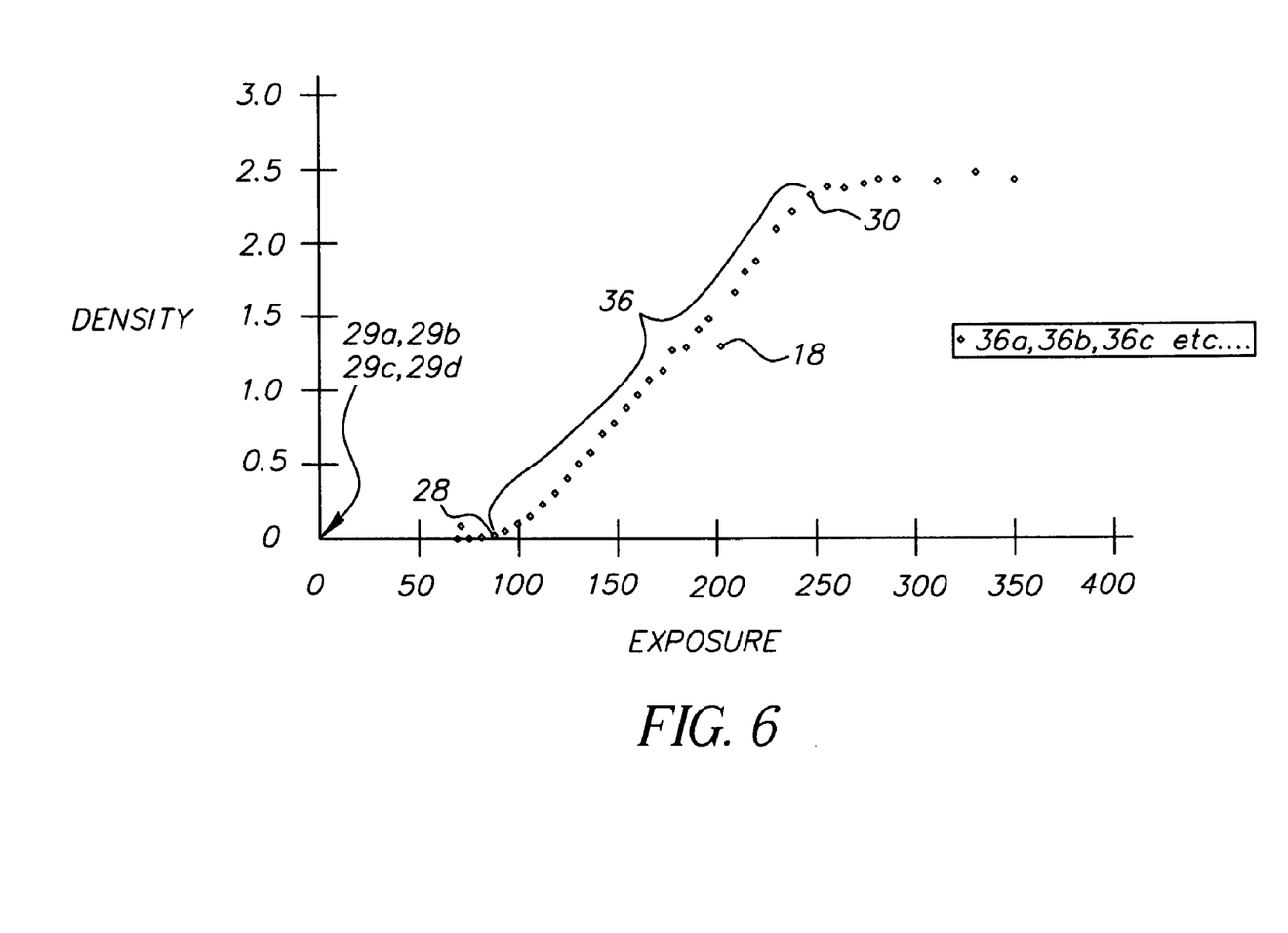
FIG. 6 shows the data set formed for use in embodiments of the invention.

A data point is removed from the measured density 22 and exposure arrays. An eight degree polynomial is fit to the remaining measured density and exposure data 22. A check is performed to determine if the removed data point lies within +/− three standard deviations from the calculated polynomial. The check is then repeated for the remaining density and exposure data points 22, as shown in FIG. 6. Points exceeding +/− three standard deviations 18 from the calculated polynomial curve are removed.

FIG. 6 shows in detail the next step in calculating a calibration curve. The next step is to determine where the first density point 28 or toe exposure 28 and the second density point 30 or shoulder exposure exist. The toe exposure point 24 is the lowest exposure required to produce a density higher than paper density 29a, 29b, 29c, 29d. The shoulder exposure 30 is the lowest exposure where the maximum density output a thermal dye donor is produced. By evaluating the derivative of density with respect to exposure the rate of change can be determined. A three point moving average is performed on the derivative of density to provide greater statistical accuracy determining the toe exposure and the shoulder exposure. An experimentally calculated threshold is used to locate the toe exposure and the shoulder exposure. Due to thermal donor differences the threshold values are unique to each thermal dye donor.

The determination of the toe exposure and the shoulder exposure are critical for controlling an eight degree polynomial 38b. The polynomial 38b is well behaved when using density and exposure data 36a, 36b, 36c between the toe exposure and the shoulder exposure. Including density and exposure data before the toe exposure and after the shoulder exposure will limit the accuracy of the polynomial 38b in the area between the toe exposure and the shoulder exposure as well as provide unpredictable results before 38a the toe exposure and after 38c the shoulder exposure.

Several thermal dye donors are capable of producing more density than is required. For these thermal donors the polynomial fit is calculated between the toe exposure and the exposure required for the maximum desired density. Limiting the density range for calculation of a polynomial 38b allows for increased accuracy for densities between the toe exposure and the maximum required density.

Densities above the shoulder exposure 30 or the maximum desired density 30 are modeled using a straight line or first slope fit 38c to the one valid data point below the shoulder exposure or maximum desired density as well as the shoulder exposure or the exposure for maximum desired density. The post-shoulder slope 38c is used to guarantee an increase in exposure will occur for an increased density request.

Densities below the toe exposure are modeled using a second slope 38a fit to the toe exposure and toe density and the paper exposure and paper density.

The calibration curve 38 is calculated by providing a list of desired densities. From the calculated polynomial 38b, the pre-toe slope 38a, and the post-shoulder slope 38c, the exposures are determined for each density request. The calibration contents are then used as a look up table during imaging.

The invention has been described in detail with particular reference to certain preferred embodiments thereof, but it will be understood that variations and modifications can be effected within the scope of the invention.

PARTS LIST 10 test pattern
18 standard deviation
28 first density point
29a paper density
29b paper density
29c paper density
29d paper density
30 second density point
38 calibration curve
36a density
36b density
36c density
38a toe exposure
38b polynomial
38c shoulder exposure
90 sets of density
91 sets of density
92 sets of density
93 sets of density
112 image processor housing
114 image processor door
115 media drive mechanism
116 media carousel
118a donor material
118b roll media
118c roll media
118c roll media
118d roll media
118e roll media
118f roll media
118g thermal print media
120 laser assembly
122 laser diodes
124 fiber optic cables
126 distribution block
128 printhead
130 vacuum imaging drum
132 donor ejection chute 134 donor waste bin
136 transport mechanism
137 exit tray
140 drive roller
142 drive roller
144 media knife assembly
146 drum load roller
148 translation bearing rods
150 translation bearing rods
152 lead screw
154 lathe bed scanning frame
156 lead screw drive nut
158 movable translation stage member
200 separate row
300 paper point
302 paper point
304 paper point
306 paper point

What is claimed is:

1. A method of calibrating a printing system comprising:
   a. imaging a test pattern wherein the test pattern comprises a set of densities, wherein each density based on a plurality of exposures which have been randomized thereby forming an imaged test pattern;
   b. scanning the densities of the imaged test pattern thereby forming a dataset;
   c. analyzing the dataset to identify outlier data;
   d. if outlier data is identified, then the test pattern undergoes a second scan, a second dataset is formed and the second dataset is analyzed for outlier data;
   e. if no outlier data is identified, a first density point and a second density point of the dataset are computed to form an array of exposures versus a density between the first and second density points;
   f. forming a polynomial calibration curve from the array of exposures and the density array;
   g. calibrating an adjustable density printing system using the polynomial calibration curve.

2. The method of claim 1, wherein the first density point is a toe density point.

3. The method of claim 2, wherein the second density point is a shoulder density point.

4. The method of claim 2, wherein the second density point is a desired density point for setting a maximum for the polynomial calibration curve.

5. The method of claim 2, calculating for a threshold of the density data to obtain the toe density point.

6. The method of claim 1, further comprising the step of laminating the test pattern onto a paper stock.

7. The method of claim 6, further comprising the step of subtracting paper density from the dataset enabling the calibration curve to be insensitive to the type of paper stock used in the printing system.

8. The method of claim 6, wherein the test pattern comprises an independent row for each set of densities and at least four points within a row comprise only paper density.

9. The method of claim 1, wherein the density of the test pattern is made from a thermal dye donor.

10. The method of claim 1, wherein the density of the test pattern comprises multiple colors.

11. The method of claim 1, wherein the test pattern is formed by a printing system comprising a printer, a laminator, a spectrometer or combinations thereof.

12. The method of claim 11, wherein the printing system comprises a laser thermal, silver halide, or an ink jet printer.

13. The method of claim 11, wherein the printing system comprises a digital printer.

14. The method of claim 11, wherein the printing system comprises a laser printer.

15. The method of claim 1, further comprising the step of removing data outside of three standard deviations from the polynomial calibration curve.

16. The method of claim 1, wherein after the step of forming a polynomial calibration curve from the array of exposures and the density array, a first slope is computed for density greater than the second density point.

17. The method of claim 16, wherein after the step of forming a polynomial calibration curve from the array of exposures and the density array, a second slope is computed for density less than the first density point.

18. The method of claim 17, wherein the first and second slopes are extensions of the polynomial calibration curve therein adapting the curve to be usable for extreme density ranges.

* * * * *